July 26, 1966 R. N. ROWE 3,263,131
ELECTRIC POWER BUSWAY WITH PLUG-IN BRANCH CIRCUIT TAKEOFF
Filed Dec. 11, 1963 2 Sheets-Sheet 2
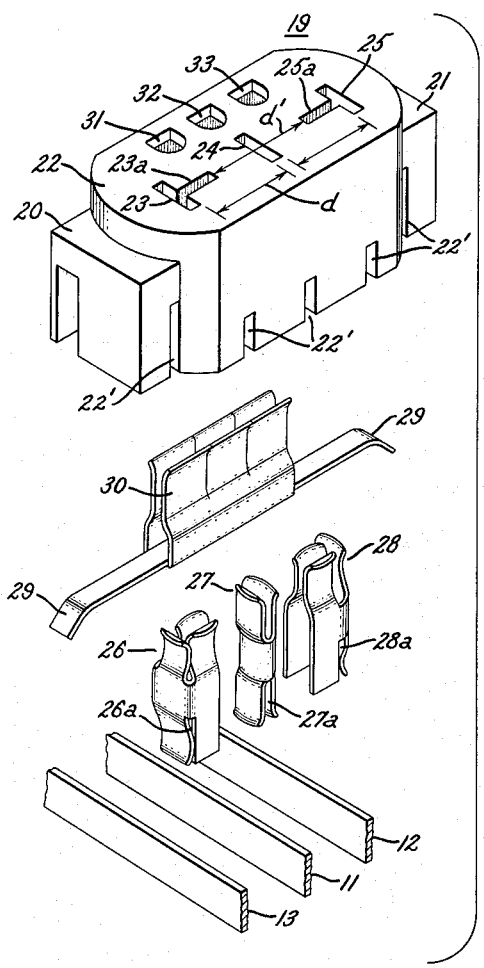
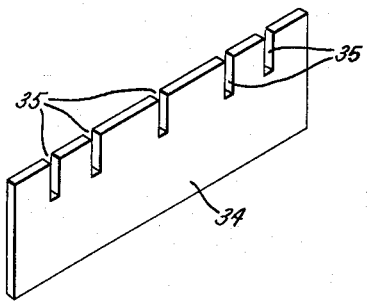
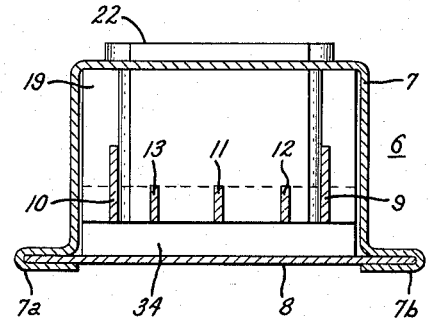
INVENTOR:
RAYMOND N. ROWE,
BY *Irving H. Marshman*
ATTORNEY.

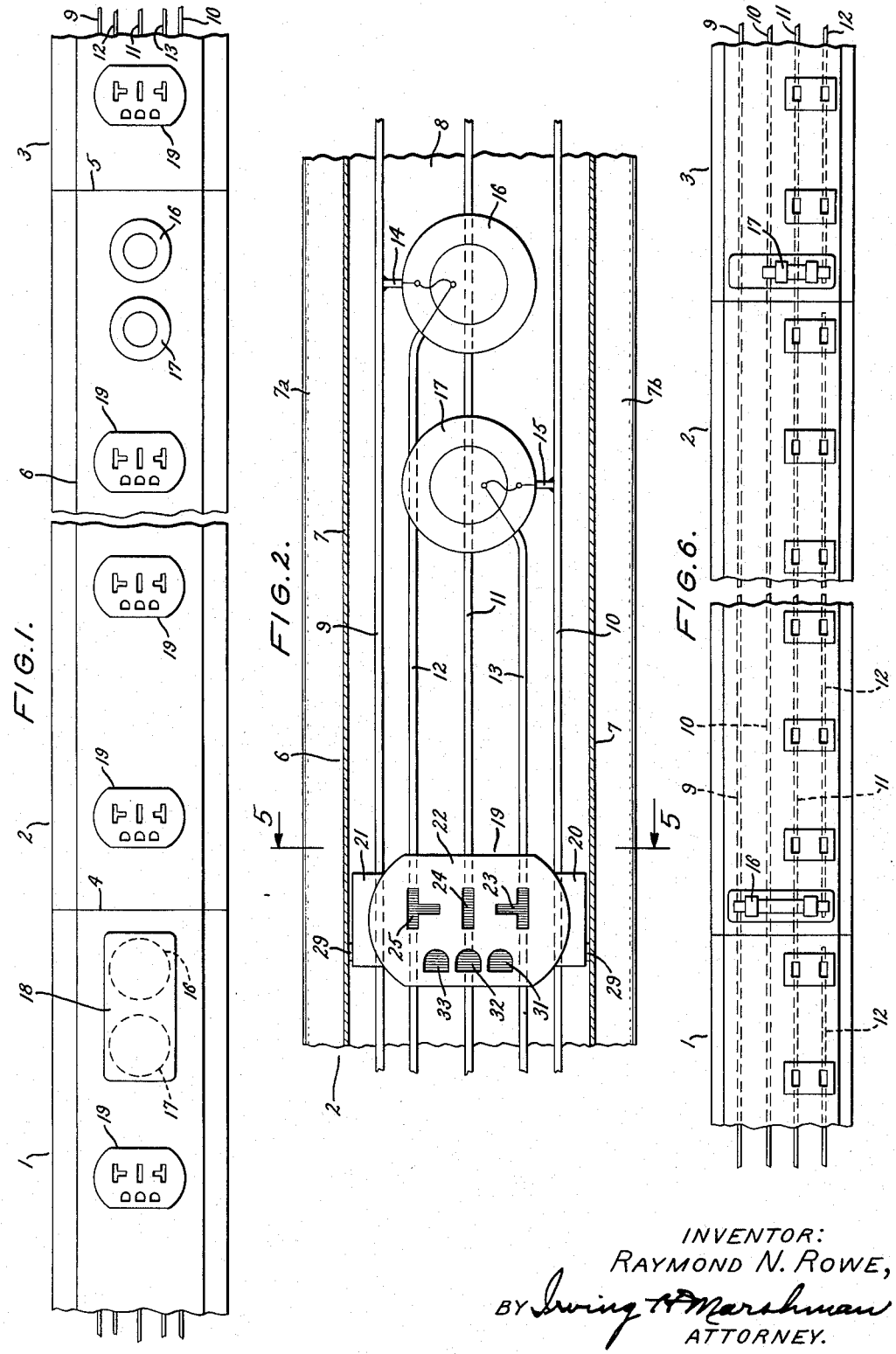

United States Patent Office 3,263,131
Patented July 26, 1966

3,263,131
ELECTRIC POWER BUSWAY WITH PLUG-IN BRANCH CIRCUIT TAKEOFF
Raymond N. Rowe, Wakefield, R.I., assignor to General Electric Company, a corporation of New York
Filed Dec. 11, 1963, Ser. No. 329,711
7 Claims. (Cl. 317—116)

This invention relates to electric power busways of the type that comprises an elongated housing containing a plurality of bus bars adapted to receive plug-in power take-off devices at longitudinally spaced points to provide supply connections to branch circuits for power tools, lighting loads and other power consumption devices, at 110 or 220 volts.

The National Electric Code requires that branch take-off circuits for electric appliances and lights be protected by 15 or 20 ampere fuses. Heretofore branch take-off circuits have been protected by a separate individual fuse in the plug of each plug-in type takeoff device. The provision of a fused plug-in device for each separate power take-off is expensive, and accordingly a specific object of this invention is the provision of an improved busway in which a single fuse serves to protect a number of individual branch circuits while still complying with the requirements of the National Electric Code.

In carrying the invention into effect in one form thereof, an electric power busway is provided which has an elongated housing in which a plurality of main bus bars and a branch circuit bus bar are supported in broad face to broad face insulated relationship within the housing. An electrical connection is provided from a first one of the main bus bars to the branch bus bar and a circuit protective device, mounted on the busway housing is included in this connection. A plurality of plug-in receptacles are mounted on the housing and each of these has connections to the branch bus bar and to the second of the main bus bars to provide a supply connection to a purality of external branch circuits.

In one of its specific aspects, the invention relates to a multi-section busway in which three main bus bars and two branch bus bars are mounted in insulated relationship in each section of the housing. The main bus bars in each section are connected to the corresponding main bus bars in the adjoining sections and constitute continuous feeder and neutral bars of a 110/220 volt single phase three wire busway. The two branch circuit bars in each section are not connected to the corresponding branch circuit bars in the immediately adjoining sections and thus, the branch circuit bars are discontinuous at each section joint. In each section of the housing a separate connection is provided from each main feeder bus bar to a corresponding one of the branch bus bars and a separate circuit protective device is included in each of these connections and is mounted on the housing. A plurality of plug-in receptacles are mounted in each section of the housing and each has connections to the branch bus bars and to the neutral to provide either 110 volt or 220 volt plug-in supply connections to external branch circuits.

For a better and more complete understanding of the invention, reference should now be had to the following specification and to the accompanying drawings of which:

FIG. 1 is a top plan view of a portion of a busway system including three interconnected busway sections;

FIG. 2 is an enlarged top plan view of a portion of a single section of the busway;

FIG. 3 is an exploded view of a combined plug-in receptacle and bus bar mounting device;

FIG. 4 is a view in perspective of a bus bar support insulator element;

FIG. 5 is a sectional view taken on the line 5—5 of FIG. 2 looking in the direction of the arrows and FIG. 6 is a top plan view of a modification.

Referring now to the drawings, the invention is shown as embodied in a busway which comprises a plurality of similar sections of predetermined or fixed length having longitudinally spaced sockets or power take-off points. In FIG. 1 is shown a portion of a busway incorporating the invention and comprising fixed length sections 1, 2 and 3. It will be understood that a busway may, and usually does, comprise more than three sections. Sections 1 and 2 meet at the line 4 and sections 2 and 3 meet at the line 5. Adjoining sections of the busway may be joined together by suitable joining means which, per se, do not constitute any part of this invention. Each of the busway sections, as shown in FIGURE 5, comprises an elongated generally rectangular cross section metallic housing or enclosure 6 which comprises a member 7 having a generally channel shaped cross section and a flat back cover plate 8. The channel shaped member has outwardly directed flanges 7a and 7b which may be crimped to the longitudinal edges of the cover plates.

Generally parallel bus bars 9, 10, 11, 12 and 13 are supported within the housing in insulated relationship therewith. These bus bars comprise relatively wide, thin, flat strip conductive material and are mounted in broad face to broad face relationship in separate planes. The bus bars 9, 10 and 11 in each section of the housing are joined to corresponding bus bars in each adjoining section and thus are continuous throughout the busway. The bars 9 and 10 constitute the main feeder bus bars and the bar 11 constitutes the neutral of a 110/220 volt single phase 3 wire busway.

The bus bars 12 and 13 in one section of the busway and the corresponding bars 12 and 13 in the adjoining sections are not joined together and thus the bars 12 and 13 are discontinuous at each section joint of the busway housing. These bars 12 and 13 serve as branch circuit bars for branch circuits having plug-in type power take-off devices.

In each section of the busway electrical conductor connections 14 and 15 are provided between the main feeder bus bars 9 and 10 and the branch circuit bus bars 12 and 13 respectively. Only one such connection between a main feeder bar and a corresponding branch circuit bar is provided in each section and preferably this connection is located in proximity to one end of the section. Fuses 16 and 17 of suitable rating, e.g. 15 or 20 amperes as required by the National Electric Code for the protection of branch circuits are included in the connections 14 and 15 respectively. These fuses may be of any suitable type. For example, they may comprise an insulator receptacle block 18 provided with threaded receptacles and fuse plugs threaded into the receptacles as illustrated in the drawings. Alternatively they may be cartridge type fuses held by fuse clips in appropriate fuse holders mounted on the housing. Thus in each section of the housing of the embodiment of FIGS. 1 and 2 there will be two branch circuit bus bars electrically separate and independent of the branch circuit bus bars in adjoining sections and they will be connected through fuses mounted in the same section to the continuous main feed bus bars that extend through all sections of the busway.

For the purpose of receiving the plug-in contacts of individual branch circuit power takeoff devices and of providing either 110 or 220 volt power connection to such devices a plurality of plug-in receptacles 19 are mounted in each section. In a ten foot section of busway, ten uniformly spaced receptacles are adequate for most branch circuit requirements. Each of these receptacles comprises a molded insulator block of generally oblong configuration and having a length slightly less than the inside distance between the walls of the channel housing member 7 so that it may be fairly snugly fitted in the channel between its side walls. The upper portion of the block is recessed at the ends thereof to provide shoulders 20 and 21 and an embossed portion 22, which, when the block is mounted in the channel member 7 projects through a stab opening in the floor of the channel, with the shoulders resting against the channel floor. As shown in FIG. 3, the insulator block is provided with transverse slots or notches $22^1$ which receive and support the main feeder and branch bus bars 9, 10, 11, 12 and 13. It is also provided with three plug-in openings 23, 24 and 25 which communicate with cavities (not shown) in which plug-in receptacle contacts 26, 27 and 28 are respectively positioned. At their distal ends these contacts are provided with slots 26a, 27a and 28a, which enable them to be stabbed on the branch bus bar 13, the neutral bar 11 and the branch bar 12, respectively. The plug-in receptacle 19 is also provided with a longitudinally disposed slot like cavity in which are positioned a spring grounding prong 29 and a grounding stab clip 30 in contact therewith to which plug-in contact is made through any one of the three semi circular plug-in openings 31, 32 and 33. Either 110 volt or 220 volt power take-off connections from the plug-in receptacle 19 to a branch circuit may be made by means of three pronged plugs having their prongs appropriately spaced and oriented. In this connection the general planes of the plug-in openings 23, 24 and 25 are parallel; consequently a plug having two plug-in prongs positioned in parallel planes and separated from each other by the distance $d$ between openings 23 and 24 may be plugged into these openings or alternatively may be plugged into the openings 24 and 25 to provide 110 volt take-off connections to a branch circuit. Such plugs should also be provided with a third contact prong of semicircular cross section and positioned with respect to the other two plug-in prongs for plugging into either of the semicircular openings 31 or 33 to engage the grounding clip 30. Alternatively, a plug having two plug-in prongs occupying a common plane and separated by the distance $d^1$ may be plugged into openings 23a and 25a to provide 220 volt take-off connections to a branch circuit. This 220 volt plug would have a third prong that is positioned with respect to the two common plane prongs to plug into the central semicircular opening 32 to engage the grounding clip 30.

The plug-in receptacle insulator block 19 is also provided with a longitudinally disposed slot for receiving a bus bar supporting insulator member 34 that may be fabricated of a suitable sheet insulating material such for example as vulcanized fiber. As illustrated in FIG. 4, one of the longitudinal edges of the supporting insulator 34 is provided with a plurality of notches 35 for receiving and supporting the bus bars 9, 10, 11, 12 and 13.

Assembly of a section of the busway is easily and inexpensively accomplished. The plug-in receptacle insulator blocks 19 are first positioned in the stab openings in the floor of the channel housing member 7 with the embossed portions 22 projecting through the stab openings and with the shoulders 20 and 21 seated against the floor of the channel member. When these insulator blocks are in position, the bent up stab on contacts 26, 27 and 28 for each insulator block are dropped in position in cavities provided for them so that their plug contact receiving slots are in position to receive the plug-in prongs of a power take-off plug-in device. Also, the grounding spring prong 29 and grounding clip 30 sub-assembly is positioned in the cavity in the insulator block provided for its reception and retention. The bent up ends of the spring grounding prong press against the side walls of the channel housing member and thus make a good solid grounding connection therewith.

Following the positioning of the stab-on contacts and the grounding sub-assembly in the receptacle insulator block, the bus bars 9, 10, 11, 12 and 13 are positioned in the transverse slots $22^1$ of all of the receptacle insulator blocks in the section and the neutral bus bar 11 and branch bus bars 12 and 13 are forced into the slots 27a, 28a and 26a respectively of the stab-on contacts 27, 28 and 26 in each of the insulator blocks.

After the bus bar members have been finally positioned in the receptacle insulator blocks 19, a slotted insulator member 34 is positioned in the centrally disposed longitudinal slot of each of the insulator blocks so that the bus bars are positioned in the slots 35 which fit around and support them. As illustrated in FIG. 5, with the insulator member 34 seated in the slot in the receptacle insulator block the bus bars are completely encircled by insulating material and are firmly supported against all movement with respect to the sidewalls of the housing; i.e., they are locked in position.

Finally the flanges 7a and 7b are crimped to the back cover 8 to complete the assembly of a busway section. A plurality of assembled individual busway sections may then be joined by any suitable joint means into a multi-section busway.

In the modification illustrated in FIG. 6, only a single branch bus bar 12 is provided in each section of the busway, and in successive sections a single fuse in each section is connected in alternation between each of the main feeder buses 9 and 10 and the branch circuit bus 12. As shown, the fuse 16 in busway section 2 is connected between main feeder bus 9 and the branch bar 12, whereas in the adjoining section 3 the fuse 17 is connected between the main feeder bus 10 and the branch circuit bus bar. This alternation in successive sections of the fused connection between the single branch circuit bus bar and the opposite main feed bus bars tends to result in a balanced load on the bus bars.

The invention is not limited to the structural details illustrated in the drawings since alterations and modifications will readily suggest themselves to persons skilled in the art without departing from the true spirit of the invention or from the scope of the annexed claims.

What I claim as new and desire to secure by Letters Patent of the United States is:

1. In a busway distribution system
   (a) a bus bar housing,
   (b) a plurality of continuous main feeder bus bars within said housing,
   (c) a branch bus bar having a plurality of separate sections mounted within said housing in spaced apart end to end relationship,
   (d) an electrical connection from each of said sections to one of said main feeder bus bars, and
   (e) a circuit protective device included in each of said electrical connections and mounted on said housing and
   (f) a plurality of plug-in receptacles each mounted on said housing and having electrical connections to one of said branch bus bar sections and to a second one of said main feeder bus bars thereby to provide a plurality of plug-in connections for a plurality of external branch circuits.

2. An electric power busway comprising
   (a) an elongated housing of generally rectangular cross section,
   (b) a plurality of main bus bars supported in parallel spaced insulated relationship within said housing,
   (c) a branch circuit bus bar supported in parallel spaced relationship with one of said main bus bars within said housing,
   (d) an electrical connection from a first of said main bus bars to said branch circuit bus bar,
   (e) a circuit protective device included in said electrical connection and mounted on said housing, and
   (f) a plurality of plug-in receptacles each comprising a moulded insulator block having slots to receive and support said bus bars and having stab contacts engaging said branch bus bar and a second of said main bus bars to provide a plug-in supply connection for an external branch circuit.

3. An electric power busway comprising
(a) an elongated housing of generally rectangular cross section,
(b) a plurality of main feeder bus bars supported within said housing in parallel spaced insulator relationship therewith,
(c) a branch circuit bus bar supported within said housing in parallel spaced relationship with said main bus bars and in insulated relationship therewith,
(d) an electrical connection from a first of said feeder bus bars to said branch bus bar,
(e) a circuit protective device included in said electrical connection and mounted on said housing,
(f) said housing having a wall adjacent said bus bars provided with an access opening, and
(g) a plug-in receptacle comprising a moulded insulator block disposed to close said opening and having slots to receive and support said bus bars and having plug-in contacts engaging said branch bus bar and a second of said main feeder bus bars to provide a plug-in supply connection to an external branch circuit.

4. An electric power busway comprising
(a) an elongated housing of generally rectangular cross section,
(b) a plurality of main feeder bus bars and a branch circuit bus bar supported within said housing in insulated parallel spaced relationship,
(c) an electrical connection from a first of said feeder bus bars to said branch bus bar,
(d) a circuit protective device included in said electrical connection,
(e) said housing having a wall adjacent said bus bars provided with an access opening, and
(f) a plug-in receptacle comprising a moulded insulator block within said housing extending between its opposing side walls and having an embossed portion disposed to close said access opening, said insulator block having slots to receive and support said bus bars and having plug-in contacts extending into said slots and engaging said branch bus bar and a second of said feeder bus bars to provide a plug-in supply connection to an external branch circuit.

5. An electric power busway comprising
(a) an elongated housing of generally rectangular cross section,
(b) a plurality of main feeder bus bars and a branch circuit bus bar supported in insulated relationship within said housing in parallel spaced relationship with each other,
(c) an electrical connection from a first of said feeder bus bars to said branch bus bar,
(d) a circuit protective device comprising a fuse plug mounted on said housing and having its fuse member electrically connected in said electrical connection,
(e) said housing having a wall provided with an access opening adjacent said bus bars,
(f) a plug-in receptacle comprising a moulded insulator block disposed to close said access opening, said insulator block having slots to receive and support said bus bars and having plug-in contacts extending into said slots and engaging said branch bus bar and a second of said main feeder bus bars to provide a plug-in supply connection for an external branch circuit, (g) said insulator block also having a slot transverse to said bus bar receiving slots, and
(h) an insulating and supporting member having one edge disposed in said transverse slot and having slots notched in said edge and disposed in register with the bus bar receiving slots in said insulator block to cooperate therewith to provide insulation completely surrounding said bus bars and supporting them against movement toward or away from the walls of said housing.

6. An electric power busway comprising
(a) an elongated housing of generally rectangular cross section,
(b) three main bus bars and a pair of branch circuit bus bars supported in insulated parallel spaced relationship within said housing, said three bus bars constituting main feeder bus bars and the neutral of a single phase three wire system,
(c) a separate electrical connection from each of said feeder bus bars to a corresponding one of said branch bus bars,
(d) a separate screw fuse plug included in each of said connections and mounted on said housing, and
(e) a plug-in receptacle device mounted on said housing and having electrical connections to said branch bus bars and to said neutral bar to provide feeder bus to feeder bus or feeder bus to neutral voltage to an external circuit.

7. An electric power busway comprising
(a) an elongated multisection housing of generally rectangular cross section,
(b) three main bus bars and a pair of branch circuit bus bars supported in insulated relationship within each section of said housing,
(c) said three main bus bars in each section being joined to the three corresponding bus bars in each adjoining section to constitute continuous feeder and neutral bars of a single phase three wire distribution system,
(d) said branch feeder bars in each of said sections being in end to end spaced apart relationship with respect to corresponding branch bars in adjoining sections of said housing,
(e) a separate electrical connection in each of said sections from each of said feeder bars to a corresponding one of said branch bars,
(f) a separate fuse receptacle included in each of said connections and mounted on the corresponding section of said housing, and
(g) at least one plug-in receptacle mounted on each of said sections of said housing and comprising a moulded insulator block having slots to receive and support said bus bars and having electrical connections to said branch bus bars and to said neutral bus bar to provide feeder to feeder or feeder to neutral voltage supply connections to an external branch circuit.

References Cited by the Examiner
UNITED STATES PATENTS

| | | | |
|---|---|---|---|
| 2,632,786 | 3/1953 | Hammerly | 173—334.1 |
| 2,883,637 | 4/1959 | Born | 339—22 |
| 3,042,890 | 7/1962 | Gamble et al. | 339—22 |
| 3,176,194 | 3/1965 | Williams | 317—119 X |

ROBERT K. SCHAEFER, *Primary Examiner.*

KATHLEEN H. CLAFFY, *Examiner.*

H. RICHMAN, W. C. GARVERT, *Assistant Examiners.*